United States Patent
Mohanty et al.

(10) Patent No.: US 12,511,614 B1
(45) Date of Patent: Dec. 30, 2025

(54) CLASS LEVEL FEATURE IMPORTANCE USING LASSO AND PROBABILISTIC GRAPHICAL MODELS

(71) Applicant: Blue Yonder Group, Inc., Scottsdale, AZ (US)

(72) Inventors: Deb Mohanty, Bangalore (IN); Phani Mitra Bulusu, Bangalore (IN); Rashid Puthiyapurayil, Bangalore (IN); Vidhi Chugh, Delhi (IN)

(73) Assignee: Blue Yonder Group, Inc., Scottsdale, AZ (US)

( * ) Notice: Subject to any disclaimer, the term of this patent is extended or adjusted under 35 U.S.C. 154(b) by 259 days.

(21) Appl. No.: 17/747,751

(22) Filed: May 18, 2022

Related U.S. Application Data

(60) Provisional application No. 63/190,419, filed on May 19, 2021.

(51) Int. Cl.
  *G06Q 10/00* (2023.01)
  *G06N 5/04* (2023.01)
  *G06N 7/01* (2023.01)
  *G06Q 10/087* (2023.01)

(52) U.S. Cl.
  CPC ............ *G06Q 10/087* (2013.01); *G06N 5/04* (2013.01); *G06N 7/01* (2023.01)

(58) Field of Classification Search
  None
  See application file for complete search history.

(56) References Cited

U.S. PATENT DOCUMENTS

| | | | | |
|---|---|---|---|---|
| 8,874,477 B2 * | 10/2014 | Hoffberg | ............. | G06Q 20/065 |
| | | | | 705/37 |
| 9,213,944 B1 * | 12/2015 | Do | ......................... | G06N 5/022 |
| 2007/0087756 A1 * | 4/2007 | Hoffberg | .......... | G06Q 10/06375 |
| | | | | 455/450 |
| 2016/0196587 A1 * | 7/2016 | Eder | .................. | G06Q 30/0276 |
| | | | | 705/14.49 |

(Continued)

OTHER PUBLICATIONS

Banerjee, Heerok. "A Comparative Study on Statistical and Neural Approaches for Optimizing Supply Chain Management (SCM) Systems." (2019). (Year: 2019).*

(Continued)

*Primary Examiner* — Gurkanwaljit Singh
(74) *Attorney, Agent, or Firm* — Spencer Fane LLP; Steven J. Laureanti

(57) ABSTRACT

Embodiments of the following disclosure provide a feature importance system and method to identify features relevant to determining whether a target variable will achieve a particular value. One example method includes generating a probabilistic graphical model to represent the performance of one or more entities in a supply chain and selecting or more target variables. The method further includes collating a list of features pertaining to the one or more selected target variables, pruning at least one of the one or more features from the list and generating one or more bins in which to distribute the one or more features in the list. The method further includes modeling a network graph incorporating the one or more features in the list and bins and determining one or more inferences pertaining to the one or more supply chain entity target variables.

20 Claims, 8 Drawing Sheets

(56) References Cited

U.S. PATENT DOCUMENTS

2018/0204111 A1* 7/2018 Zadeh .................. G06V 10/764
2020/0159603 A1* 5/2020 Panda ................. H04L 43/0817

OTHER PUBLICATIONS

Jiang, Zhengshen, et al. "A novel Bayesian ensemble pruning method." 2016 IEEE 16th International Conference on Data Mining Workshops (ICDMW). IEEE, 2016. (Year: 2016).*

Singh, Akshit, Nagesh Shukla, and Nishikant Mishra. "Social media data analytics to improve supply chain management in food industries." Transportation Research Part E: Logistics and Transportation Review 114 (2018): 398-415. (Year: 2018).*

Shi, L. (2014). Using probabilistic graphical models to draw inferences in sensor networks with tracking applications (Order No. 3622811). Available from ProQuest Dissertations and Theses Professional. (Year: 2014).*

Shinde, A. (2012). Modeling frameworks for supply chain analytics (Order No. 3503623). Available from ProQuest Dissertations and Theses Professional. (Year: 2012).*

Covaci, Florina Livia, and Pascale Zaraté. "Modelling decision making in digital supply chains: insights from the petroleum industry." Kybernetes 49.4 (2019): 1213-1228. (Year: 2019).*

Modaresi, S. (2018). Data-driven learning models with applications to retail operations (Order No. 10823700). Available from ProQuest Dissertations and Theses Professional. (Year: 2018).*

Gimpel, Kevin, and Daniel Rudoy. Statistical inference in graphical models. Massachusetts Institute of Technology, Lincoln Laboratory, 2008. (Year: 2008).*

Sillanpää, V.; Liesiö, J. Forecasting replenishment orders in retail: value of modelling low and intermittent consumer demand with distributions. International Journal of Production Research, [s. l.], v. 56, n. 12, p. 4168-4185, 2018. (Year: 2018).*

* cited by examiner

| | LASSO - 3CLASS | | | RF |
|---|---|---|---|---|
| | 6059 | 1964 | 34220 | |
| | <0.5 | 0.5 TO 0.8 | >0.8 | |
| 410 | CLASS1 | CLASS2 | CLASS3 | MODEL |
| ATF_volume_W0 | 0.0123 | 0.009337 | 0.0217 | 0.037128 |
| ATF_count_W0 | 0.0124 | 0.009316 | 0.0217 | 0.021348 |
| ATF_volume_W-1 | 0.012 | 0.00937 | 0.0214 | 0.027399 |
| ATF_count_W-1 | 0.012 | 0.009359 | 0.0214 | 0.01729 |
| ATF_volume_W-2 | 0.0117 | 0.009231 | 0.0209 | 0.009632 |
| ATF_count_W-2 | 0.0116 | 0.009212 | 0.0209 | 0.00753 |
| ATF_volume_W-3 | 0.0114 | 0.009174 | 0.0206 | 0.002399 |
| ATF_count_W-3 | 0.0114 | 0.009153 | 0.0205 | 0.003896 |
| stock_no_pending/SS_w0 | 0.026 | 0.013174 | 0.0392 | 0.123223 |
| stock_no_pending/SS_w1 | 0.026 | 0.012893 | 0.0389 | 0.142265 |
| stock_no_pending/SS_w2 | 0.0292 | 0.015598 | 0.0448 | 0.131272 |
| stock_no_pending/SS_w3 | 0.0322 | 0.017995 | 0.0502 | 0.143769 |
| STOCK/SS_W0 | 0.0276 | 0.020165 | 0.0477 | 0.069264 |
| STOCK/SS_W1 | 0.0273 | 0.020264 | 0.0476 | 0.06934 |
| STOCK/SS_W2 | 0.0314 | 0.024888 | 0.0563 | 0.034226 |
| STOCK/SS_W3 | 0.0335 | 0.026164 | 0.0596 | 0.054843 |
| SS_W1/SS_W0 | 0.0145 | 0.013578 | 0.028 | 0.000236 |

TO FIG. 4B

FROM FIG. 4A

| | | | | |
|---|---|---|---|---|
| SS_W2/SS_W0 | 0.0149 | 0.014067 | 0.029 | 0 |
| SS_W3/SS_W0 | 0.0149 | 0.014202 | 0.0291 | 0 |
| ENT_TOT_vs_PLN_QT_new | 0.0021 | 0.006482 | 0.0085 | 0 |
| R_1W_W0 | 0.0026 | 0.004139 | 0.0016 | 0.033144 |
| R_2W_W0 | 0.0025 | 0.009795 | 0.0123 | 0.022293 |
| R_3W_W0 | 0.0179 | 0.012702 | 0.0306 | 0.012042 |
| R_1W_W1 | 8E-05 | 0.000112 | 4E-05 | 0013293 |
| R_2W_W1 | 0.0068 | 0.003676 | 0.0032 | 0.009739 |
| R_3W_W1 | 0.0068 | 0.003621 | 0.0031 | 0.001205 |
| R_1W_W2 | 0.0032 | 0.005031 | 0.0082 | 0 |
| R_2W_W2 | 0.0007 | 0.002871 | 0.0036 | 0 |
| R_3W_W2 | 0.0007 | 0.002467 | 0.0032 | 0.000209 |
| stock_needs_ratio_W-2 | 0.0013 | 0.001933 | 0.0007 | 0 |
| stock_needs_ratio_W-1 | 0.0006 | 0.001099 | 0.0005 | 0.001131 |
| stock_needs_ratio_W-0 | 0.0032 | 0.006333 | 0.0031 | 0.008104 |
| stock_needs_ratio_W-1 | 0.0002 | 0.00083 | 0.001 | 0.003781 |
| stock_needs_ratio_W-2 | 0.0068 | 0.004127 | 0.0109 | 0 |
| ratio_DC_capacity_new | 0.0077 | 0.006839 | 0.0145 | 0 |
| Logistics_W0 | 0.0171 | 0.012369 | 0.0294 | 0 |
| Logistics_W-1 | 0.0169 | 0.01245 | 0.0293 | 0 |
| Logistics_W-2 | 0.0164 | 0.012183 | 0.0286 | 0 |
| Logistics_W-3 | 0.0166 | 0.01205 | 0.0287 | 0 |

FIG. 4B

CLASS LEVEL FEATURE IMPORTANCE USING LASSO AND PROBABILISTIC GRAPHICAL MODELS

CROSS REFERENCE TO RELATED APPLICATIONS

The present disclosure is related to that disclosed in the U.S. Provisional Application No. 63/190,419, filed May 19, 2021, entitled "Class Level Feature Importance Using Lasso and Probabilistic Graphical Models." U.S. Provisional Application No. 63/190,419 is assigned to the assignee of the present application. The present invention hereby claims priority under 35 U.S.C. § 119(e) to U.S. Provisional Application No. 63/190,419.

TECHNICAL FIELD

The present disclosure relates generally to supply chain planning and specifically to determining the relevance and importance of features and feature classes in supply chain machine learning systems.

BACKGROUND

Supply chain machine learning systems may generate one or more probabilistic graphical models (PGMs), including but not limited to Bayesian networks, to model the flow of materials through one or more supply chain networks and the individual entities, such as manufacturers, suppliers, retailers, and transportation hubs, which comprise supply chain networks. Bayesian networks may comprise one or more PGMs that represent a set of variables and their conditional dependencies via a directed acyclic graph (DAG). However, modeling the flow of all variables through a supply chain network using a Bayesian network PGM may generate an extremely dense, convoluted PGM that (1) requires the investment of significant time and resources from which to interpret and derive meaningful inferences, and (2) does not assess and emphasize the relative importance of some features and feature classes relative to other features and feature classes, which is undesirable.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

FIGS. 4A-4B illustrate features display 400, according to an embodiment;

DETAILED DESCRIPTION

Figure 1:
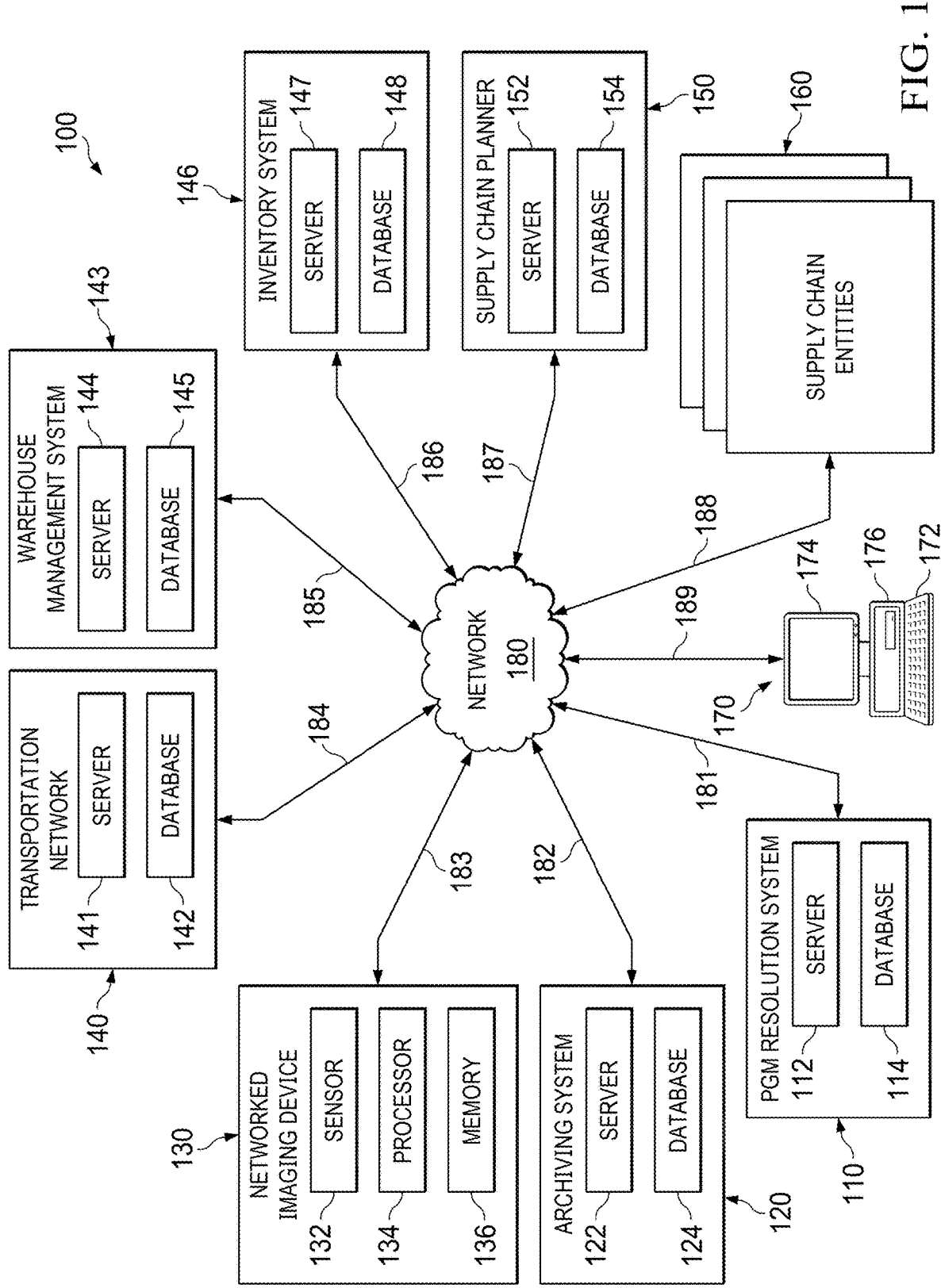
FIG. 1 illustrates a supply chain network, in accordance with a first embodiment.

Aspects and applications of the invention presented herein are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

Embodiments of the following disclosure provide a probabilistic graphical model (PGM) feature importance system and method to identify the specific features or feature classes relevant to determining whether a selected supply chain data target variable will achieve a particular value. The PGM feature importance system and method selects a target variable and uses one or more machine learning models and a least absolute shrinkage and selection operator (LASSO) regression analysis method to perform variable selection and regularization of one or more machine learning models in order to determine the importance of one or more model features and feature classes. The PGM feature importance system and method prunes features based on feature importance, bins the features, and generates a PGM network, including but not limited to a Bayesian PGM network, based on the pruned and binned features. The PGM feature importance system and method enables the drawing of inferences based on one or more features or feature classes related to the selected target variable.

Embodiments of the following disclosure generate one or more PGM networks, including one or more Bayesian PGM networks, which comprise and graph only important features and feature classes drawn from supply chain data. The PGM networks and/or Bayesian PGM networks limit the complexity of data displayed and modeled by the probabilistic graphical models, and enable the drawing of inferences and other data from the probabilistic graphical models quickly and efficiently without slowing the analysis process with the addition of unnecessary data, features, and feature classes. In turn, the PGM networks and/or Bayesian PGM networks enable supply chain planners to interact with supply chain data, and make planning decisions based on the supply chain data, rapidly and with confidence that important features and feature classes are accounted for.

FIG. 1 illustrates supply chain network 100, in accordance with a first embodiment. Supply chain network 100 comprises probabilistic graphical model (PGM) feature importance system 110, archiving system 120, one or more networked imaging devices 130, transportation network 140, warehouse management system 143, inventory system 146, supply chain planner 150, one or more supply chain entities 160, computer 170, network 180, and one or more communication links 181-189. Although a single PGM feature importance system 110, a single archiving system 120, a single networked imaging device 130, a single transportation network 140, a single warehouse management system 143, a single inventory system 146, a single supply chain planner 150, one or more supply chain entities 160, a single computer 170, a single network 180, and one or more communication links 181-189 are illustrated and described, embodiments contemplate any number of PGM feature importance systems 110, archiving systems 120, networked imaging devices 130, transportation networks 140, warehouse management systems 143, inventory systems 146, supply chain planners 150, supply chain entities 160, computers 170, networks 180, or communication links 181-189, according to particular needs.

In one embodiment, PGM feature importance system 110 comprises server 112 and database 114. Server 112 comprises one or more modules that model a supply chain network and build probabilistic graphical models of supply chain attributes. In one embodiment, PGM feature importance system 110 uses one or more machine learning models and a least absolute shrinkage and selection operator (LASSO) regression analysis method to perform variable selection and regularization of one or more machine learning models in order to determine the importance of one or more model features and feature classes, which may include, for example, features related to one or more key performance indicators (KPIs) or service levels related to one or more service level agreements (SLAs).

Archiving system 120 of supply chain network 100 comprises server 122 and database 124. Although archiving system 120 is illustrated as comprising a single server 122 and a single database 124, embodiments contemplate any suitable number of servers 122 or databases 124 internal to or externally coupled with archiving system 120. Server 122 may support one or more processes for receiving and storing data from transportation network 140, warehouse management system 143, inventory system 146, supply chain planner 150, networked imaging devices 130, one or more supply chain entities 160, and/or computer 170 of supply chain network 100. According to some embodiments, archiving system 120 comprises an archive of data received from transportation network 140, warehouse management system 143, inventory system 146, supply chain planner 150, networked imaging devices 130, one or more supply chain entities 160, and/or computer 170 of supply chain network 100. Archiving system 120 provides archived data to PGM feature importance system 110 and one or more supply chain planners 150 to, for example, train PGM feature importance system 110 model and train one or more machine learning models, including but not limited to one or more LASSO machine learning models. Server 122 may store the received data in database 124. Database 124 may comprise one or more databases or other data storage arrangement at one or more locations, local to, or remote from, server 122.

One or more networked imaging devices 130 comprise one or more sensors 132, one or more processors 134, memory 136, and may include any suitable input device 172, output device 174, fixed or removable computer-readable storage media 176, or the like. According to embodiments, one or more networked imaging devices 130 comprise an electronic device that receives imaging data from one or more sensors 132 or from one or more databases in supply chain network 100. One or more sensors 132 of one or more networked imaging devices 130 may comprise an imaging sensor, such as, a camera, scanner, electronic eye, photodiode, charged coupled device (CCD), or any other electronic component that detects visual characteristics (such as color, shape, size, fill level, or the like) of objects. One or more networked imaging devices 130 may comprise, for example, a mobile handheld electronic device such as, for example, a smartphone, a tablet computer, a wireless communication device, and/or one or more networked electronic devices configured to image items using one or more sensors 132 and transmit product images to one or more databases.

In addition, or as an alternative, one or more sensors 132 may comprise a radio receiver and/or transmitter configured to read an electronic tag, such as, for example, a radio-frequency identification (RFID) tag. Each item may be represented in supply chain network 100 by an identifier, including, for example, Stock-Keeping Unit (SKU), Universal Product Code (UPC), serial number, barcode, tag, RFID, or like objects that encode identifying information. One or more networked imaging devices 130 may generate a mapping of one or more items in supply chain network 100 by scanning an identifier or object associated with an item and identifying the item based, at least in part, on the scan. This may include, for example, a stationary scanner located at one or more supply chain entities 160 that scans items as the items pass near the scanner. In an embodiment, PGM feature importance system 110, archiving system 120, networked imaging devices 130, transportation network 140, warehouse management system 143, inventory system 146, supply chain planner 150, and/or one or more supply chain entities 160 may use the mapping of an item to locate the item in supply chain network 100. The location of the item may be used to coordinate the storage and transportation of items in supply chain network 100 according to one or more plans and/or a reallocation of materials or capacity generated by supply chain planner 150. Plans may comprise one or more of a master supply chain plan, production plan, operations plan, distribution plan, and the like.

In addition, one or more sensors 132 of one or more networked imaging devices 130 may be located at one or more locations local to, or remote from, one or more networked imaging devices 130, including, for example, one or more sensors 132 integrated into one or more networked imaging devices 130 or one or more sensors 132 remotely located from, but communicatively coupled with, one or more networked imaging devices 130. According to some embodiments, one or more sensors 132 may be configured to communicate directly or indirectly with one or more of PGM feature importance system 110, archiving system 120, networked imaging device 130, transportation network 140, warehouse management system 143, inventory system 146, supply chain planner 150, one or more supply chain entities 160, computer 170, and/or network 180 using one or more communication links 181-189.

Transportation network 140 of supply chain network 100 comprises server 141 and database 142. Although transportation network 140 is illustrated as comprising a single server 141 and a single database 142, embodiments contemplate any suitable number of servers 141 or databases 142 internal to or externally coupled with transportation network 140. According to embodiments, transportation network 140 directs one or more transportation vehicles to ship one or more items between one or more supply chain entities 160, based, at least in part, on a supply chain plan, including a supply chain master plan, the number of items currently in stock at one or more supply chain entities 160 or other stocking location, the number of items currently in transit in transportation network 140, a forecasted demand, a supply chain disruption, and/or one or more other factors described herein. One or more transportation vehicles comprise, for example, any number of trucks, cars, vans, boats, airplanes, unmanned aerial vehicles (UAVs), cranes, robotic machinery, or the like. The one or more transportation vehicles may comprise radio, satellite, or other communication that communicates location information (such as, for example, geographic coordinates, distance from a location, global positioning satellite (GPS) information, or the like) with PGM feature importance system 110, archiving system 120, networked imaging device 130, transportation network 140, warehouse management system 143, inventory system 146, supply chain planner 150, and/or one or more supply chain entities 160 to identify the location of the one or more transportation vehicles and the location of any inventory or shipment located on the one or more transportation vehicles.

Warehouse management system 143 of supply chain network 100 comprises server 144 and database 145. Although warehouse management system 143 is illustrated as comprising a single server 144 and a single database 145, embodiments contemplate any suitable number of servers 144 or databases 145 internal to or externally coupled with warehouse management system 143. According to embodiments, server 144 comprises one or more modules that manage and operate warehouse operations, plan timing and identity of shipments, generate picklists, packing plans, and instructions. Warehouse management system 143 instructs users and/or automated machinery to obtain picked items and generates instructions to guide placement of items on a picklist in the configuration and layout determined by a packing plan. For example, the instructions may instruct a user and/or automated machinery to prepare items on a picklist for shipment by obtaining the items from inventory or a staging area and packing the items on a pallet in a proper configuration for shipment. Embodiments contemplate warehouse management system 143 determining routing, packing, or placement of any item, package, or container into any packing area, including, packing any item, package, or container in another item, package, or container. Warehouse management system 143 may generate instructions for packing products into boxes, packing boxes onto pallets, packing loaded pallets into trucks, or placing any item, container, or package in a packing area, such as, for example, a box, a pallet, a shipping container, a transportation vehicle, a shelf, a designated location in a warehouse (such as a staging area), and the like.

Inventory system 146 of supply chain network 100 comprises server 147 and database 148. Although inventory system 146 is illustrated as comprising a single server 147 and a single database 148, embodiments contemplate any suitable number of servers 147 or databases 148 internal to or externally coupled with inventory system 146. Server 147 is configured to receive and transmit item data, including item identifiers, pricing data, attribute data, inventory levels, and other like data about one or more items at one or more stocking locations in supply chain network 100. Serve 147 stores and retrieves item data from database 148 or from one or more locations in supply chain network 100.

Supply chain planner 150 of supply chain network 100 comprises server 152 and database 154. Although supply chain planner 150 is illustrated as comprising a single server 152 and a single database 154, embodiments contemplate any suitable number of servers 152 or databases 154 internal to or externally coupled with supply chain planner 150. Server 152 of supply chain planner 150 comprises one or more modules, such as, for example, a planning module 250, a solver 254, a modeler 252, and/or an engine, for performing activities of one or more planning and execution processes. Supply chain planner 150 may model and solve supply chain planning problems (such as, for example, operation planning problems). Supply chain planner 150 generates the supply chain planning problem solutions, which are used by PGM feature importance system 110 to construct training data. In one embodiment, supply chain planner 150 may use a probabilistic graphical model to predict target supply chain attributes needed to reach a target state of the supply chain, or other predicted supply chain information or status, as described in further detail below.

One or more supply chain entities 160 may represent one or more suppliers, manufacturers, distribution centers, and retailers in one or more supply chain networks, including one or more enterprises. One or more suppliers may be any suitable entity that offers to sell or otherwise provides one or more components to one or more manufacturers. One or more suppliers may, for example, receive a product from a first supply chain entity in supply chain network 100 and provide the product to another supply chain entity 160. One or more suppliers may comprise automated distribution systems that automatically transport products to one or more manufacturers based, at least in part, on a supply chain plan, the number of items currently in stock at one or more supply chain entities 160, the number of items currently in transit in transportation network 140, a forecasted demand, a supply chain disruption, a material or capacity reallocation, current and projected inventory levels at one or more stocking locations, and/or one or more additional factors described herein.

A manufacturer may be any suitable entity that manufactures at least one product. A manufacturer may use one or more items during the manufacturing process to produce any manufactured, fabricated, assembled, or otherwise processed item, material, component, good or product. Items may comprise, for example, components, materials, products, parts, supplies, or other items, that may be used to produce products. In addition, or as an alternative, an item may comprise a supply or resource that is used to manufacture the item, but does not become a part of the item. In one embodiment, a product represents an item ready to be supplied to, for example, another supply chain entity 160, such as a supplier, an item that needs further processing, or any other item. A manufacturer may, for example, produce and sell a product to a supplier, another manufacturer, a distribution center, a retailer, a customer, or any other suitable person or an entity. Such manufacturers may comprise automated robotic production machinery that produce products based, at least in part, on a supply chain plan, the number of items currently in stock at one or more supply chain entities 160, the number of items currently in transit in transportation network 140, a forecasted demand, a supply chain disruption, a material or capacity reallocation, current and projected inventory levels at one or more stocking locations, and/or one or more additional factors described herein.

One or more distribution centers may be any suitable entity that offers to sell or otherwise distributes at least one product to one or more retailers and/or customers. Distribution centers may, for example, receive a product from a first supply chain entity 160 in supply chain network 100 and store and transport the product for a second supply chain entity 160. Such distribution centers may comprise automated warehousing systems that automatically transport to one or more retailers or customers and/or automatically remove an item from, or place an item into, inventory based, at least in part, on a supply chain plan, the number of items currently in stock at one or more supply chain entities 160, the number of items currently in transit in transportation network 140, a forecasted demand, a supply chain disruption, a material or capacity reallocation, current and projected inventory levels at one or more stocking locations, and/or one or more additional factors described herein.

One or more retailers may be any suitable entity that obtains one or more products to sell to one or more customers. In addition, one or more retailers may sell, store, and supply one or more components and/or repair a product with one or more components. One or more retailers may comprise any online or brick and mortar location, including locations with shelving systems. Shelving systems may comprise, for example, various racks, fixtures, brackets, notches, grooves, slots, or other attachment devices for fixing shelves in various configurations. These configurations may comprise shelving with adjustable lengths, heights, and other arrangements, which may be adjusted by an employee of one or more retailers based on computer-generated instructions or automatically by machinery to place products in a desired location, and which may be based, at least in part, on a supply chain plan, the number of items currently in stock at one or more supply chain entities 160, the number of items currently in transit in transportation network 140, a forecasted demand, a supply chain disruption, a material or capacity reallocation, current and projected inventory levels at one or more stocking locations, and/or one or more additional factors described herein.

Although one or more suppliers, manufacturers, distribution centers, and retailers are illustrated and described as separate and distinct entities, the same entity may simultaneously act as any one or more suppliers, manufacturers, distribution centers, and retailers. For example, one or more manufacturers acting as a manufacturer could produce a product, and the same entity could act as a supplier to supply a product to another supply chain entity. Although one example of a supply chain network is illustrated and described, embodiments contemplate any configuration of supply chain network 100, without departing from the scope of the present disclosure.

As illustrated by FIG. 1, supply chain network 100 comprising PGM feature importance system 110, archiving system 120, one or more networked imaging devices 130, transportation network 140, warehouse management system 143, inventory system 146, supply chain planner 150, and one or more supply chain entities 160 may operate on one or more computers 170 that are integral to or separate from the hardware and/or software that support PGM feature importance system 110, archiving system 120, one or more networked imaging devices 130, transportation network 140, warehouse management system 143, inventory system 146, supply chain planner 150, and one or more supply chain entities 160. One or more computers 170 may include any suitable input device 172, such as a keypad, mouse, touch screen, microphone, or other device to input information. One or more computers 170 may also comprise one or more output devices 174, including but not limited to one or more computer monitors, which may convey information associated with the operation of supply chain network 100, including digital or analog data, visual information, or audio information.

One or more computers 170 may include fixed or removable computer-readable storage media 176, including a non-transitory computer readable medium, magnetic computer disks, flash drives, CD-ROM, in-memory devices or other suitable media to receive output from and provide input to supply chain network 100. One or more computers 170 may include one or more processors and associated memory to execute instructions and manipulate information according to the operation of supply chain network 100 and any of the methods described herein. In addition, or as an alternative, embodiments contemplate executing the instructions on one or more computers 170 that cause one or more computers 170 to perform functions of the method. An apparatus implementing special purpose logic circuitry, for example, one or more field programmable gate arrays (FPGA) or application-specific integrated circuits (ASIC), may perform functions of the methods described herein. Further examples may also include articles of manufacture including tangible computer-readable media that have computer-readable instructions encoded thereon, and the instructions may comprise instructions to perform functions of the methods described herein.

PGM feature importance system 110, archiving system 120, one or more networked imaging devices 130, transportation network 140, warehouse management system 143, inventory system 146, supply chain planner 150, and one or more supply chain entities 160 may each operate on one or more separate computers 170, a network of one or more separate or collective computers, or may operate on one or more shared computers. In addition, supply chain network 100 may comprise a cloud-based computing system having processing and storage devices at one or more locations, local to, or remote from PGM feature importance system 110, archiving system 120, one or more networked imaging devices 130, transportation network 140, warehouse management system 143, inventory system 146, supply chain planner 150, and one or more supply chain entities 160. In addition, each of one or more computers 170 may be a work station, personal computer (PC), network computer, notebook computer, tablet, personal digital assistant (PDA), cell phone, telephone, smartphone, mobile device, wireless data port, augmented or virtual reality headset, or any other suitable computing device. In an embodiment, one or more users may be associated with PGM feature importance system 110, archiving system 120, one or more networked imaging devices 130, transportation network 140, warehouse management system 143, inventory system 146, supply chain planner 150, and one or more supply chain entities 160.

These one or more users may include, for example, a "manager" or a "planner" handling supply chain planning, training PGM feature importance system 110, and/or one or more related tasks within supply chain network 100. In addition, or as an alternative, these one or more users within supply chain network 100 may include, for example, one or more computers 170 programmed to autonomously handle, among other things, production planning, demand planning, option planning, sales and operations planning, operation planning, supply chain master planning, plan adjustment after supply chain disruptions, order placement, automated warehouse operations (including removing items from and placing items in inventory), robotic production machinery (including producing items), and/or one or more related tasks within supply chain network 100.

In one embodiment, PGM feature importance system 110 may be coupled with network 180 using communications link 181, which may be any wireline, wireless, or other link suitable to support data communications between PGM feature importance system 110 and a network during operation of supply chain network 100. Archiving system 120 may be coupled with network 180 using communications link 182, which may be any wireline, wireless, or other link suitable to support data communications between archiving system 120 and network 180 during operation of supply chain network 100. One or more networked imaging devices 130 are coupled with network 180 using communications link 183, which may be any wireline, wireless, or other link suitable to support data communications between one or more networked imaging devices 130 and network 180 during operation of distributed supply chain network 100. Transportation network 140 may be coupled with network 180 using communications link 184, which may be any wireline, wireless, or other link suitable to support data communications between transportation network 140 and network 180 during operation of supply chain network 100. Warehouse management system 143 may be coupled with network 180 using communications link 185, which may be any wireline, wireless, or other link suitable to support data communications between warehouse management system 143 and network 180 during operation of supply chain network 100. Inventory system 146 may be coupled with network 180 using communications link 186, which may be any wireline, wireless, or other link suitable to support data communications between inventory system 146 and network 180 during operation of supply chain network 100. Supply chain planner 150 may be coupled with network 180 using communications link 187, which may be any wireline, wireless, or other link suitable to support data communications between supply chain planner 150 and network 180 during operation of supply chain network 100. One or more supply chain entities 160 may be coupled with network 180 using communications link 188, which may be any wireline, wireless, or other link suitable to support data communications between one or more supply chain entities 160 and network 180 during operation of supply chain network 100. One or more computers 170 may be coupled with network 180 using communications link 189, which may be any wireline, wireless, or other link suitable to support data communications between computer 170 and network 180 during operation of supply chain network 100.

Although communication links 181-189 are illustrated as generally coupling PGM feature importance system 110, archiving system 120, networked imaging devices 130, transportation network 140, warehouse management system 143, inventory system 146, supply chain planner 150, one or more supply chain entities 160, and computer 170 to network 180, each of PGM feature importance system 110, archiving system 120, the networked imaging devices 130, transportation network 140, warehouse management system 143, inventory system 146, supply chain planner 150, one or more supply chain entities 160, and computer 170 may communicate directly with each other, according to particular needs.

In another embodiment, network 180 includes the Internet and any appropriate local area networks (LANs), metropolitan area networks (MANs), or wide area networks (WANs) coupling PGM feature importance system 110, archiving system 120, networked imaging devices 130, transportation network 140, warehouse management system 143, inventory system 146, supply chain planner 150, one or more supply chain entities 160, and computer 170. For example, data may be maintained locally or externally of PGM feature importance system 110, archiving system 120, networked imaging devices 130, transportation network 140, warehouse management system 143, inventory system 146, supply chain planner 150, one or more supply chain entities 160, and computer 170 and made available to one or more associated users of PGM feature importance system 110, archiving system 120, networked imaging devices 130, transportation network 140, warehouse management system 143, inventory system 146, supply chain planner 150, one or more supply chain entities 160, and computer 170 using network 180 or in any other appropriate manner. Those skilled in the art will recognize that the complete structure and operation of network 180 and other components within supply chain network 100 are not depicted or described. Embodiments may be employed in conjunction with known communications networks and other components.

In accordance with the principles of embodiments described herein, supply chain planner 150 may generate a supply chain plan. Furthermore, one or more computers 170 associated with transportation network 140, warehouse management system 143, and inventory system 146 may instruct automated machinery (i.e., robotic warehouse systems, robotic inventory systems, automated guided vehicles, mobile racking units, automated robotic production machinery, robotic devices and the like) to adjust product mix ratios, inventory levels at various stocking points, production of products of manufacturing equipment, proportional or alternative sourcing of one or more supply chain entities 160, and the configuration and quantity of packaging and shipping of items based on a supply chain plan, the number of items currently in stock at one or more supply chain entities 160, the number of items currently in transit in transportation network 140, a forecasted demand, a supply chain disruption, a material or capacity reallocation, current and projected inventory levels at one or more stocking locations, and/or one or more additional factors described herein. For example, the methods described herein may include computers 170 receiving product data from automated machinery having at least one sensor and product data 264 corresponding to an item detected by the automated machinery. The received product data may include an image of the item, an identifier, as described above, and/or product information associated with the item, including, for example, dimensions, texture, estimated weight, and the like. Computers 170 may also receive, from one or more sensors 132 of one or more networked imaging devices 130, a current location of the identified item.

The methods may further include computers 170 looking up the received product data in the database system associated with one or more supply chain planners 150 to identify the item corresponding to product data 264 received from automated machinery. Based on the identification of the item, computers 170 may also identify (or alternatively generate) a first mapping in the database system, where the first mapping is associated with the current location of the identified item. Computers 170 may also identify a second mapping in the database system, where the second mapping is associated with a past location of the identified item. Computers 170 may also compare the first mapping and the second mapping to determine if the current location of the identified item in the first mapping is different than the past location of the identified item in the second mapping. Computers 170 may send instructions to the automated machinery based, as least in part, on one or more differences between the first mapping and the second mapping such as, for example, to locate items to add to or remove from an inventory of or shipment for one or more supply chain entities 160. In addition, or as an alternative, transportation network 140, warehouse management system 143, inventory system 146, and supply chain planner 150 monitor one or more supply chain constraints of one or more items at one or more supply chain entities 160 and adjust the orders and/or inventory of one or more supply chain entities 160 at least partially based on one or more supply chain constraints.

Figure 2:
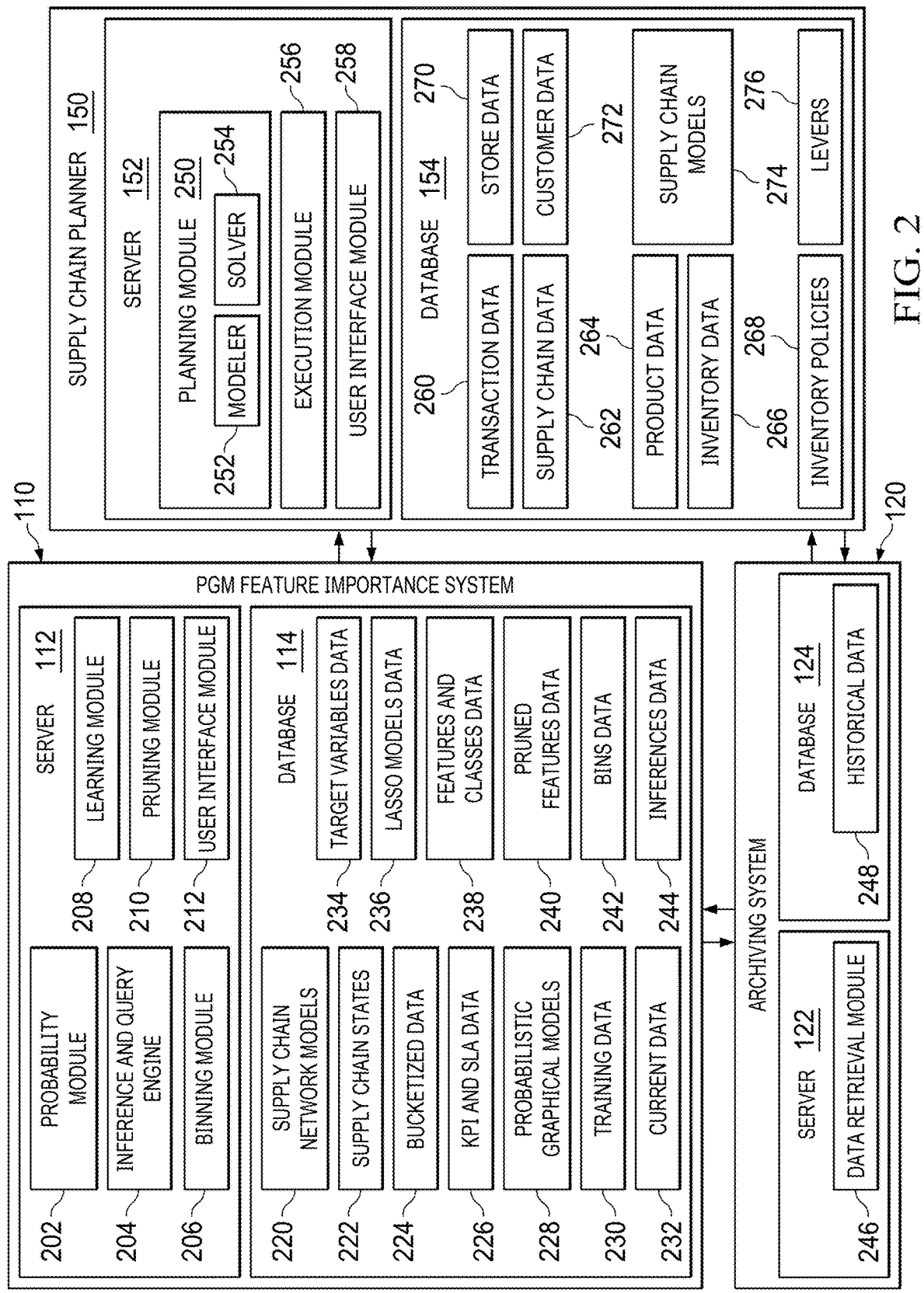
FIG. 2 illustrates the probabilistic graphical model feature importance system, the archiving system, and supply chain planner of FIG. 1 in greater detail, in accordance with an embodiment.

FIG. 2 illustrates PGM feature importance system 110, archiving system 120, and supply chain planner 150 of FIG. 1 in greater detail, in accordance with an embodiment. PGM feature importance system 110 comprises server 112 and database 114, as described above. Although PGM feature importance system 110 is illustrated as comprising a single server 112 and a single database 114, embodiments contemplate any suitable number of servers 112 or databases 114 internal to or externally coupled with PGM feature importance system 110.

Server 112 comprises probability module 202, inference and query engine 204, binning module 206, learning module 208, pruning module 210, and user interface module 212. Although server 112 is illustrated and described as comprising a single probability module 202, a single inference and query engine 204, a single binning module 206, a single learning module 208, a single pruning module 210, and a single user interface module 212, embodiments contemplate any suitable number or combination of these located at one or more locations, local to, or remote from PGM feature importance system 110, such as on multiple servers or computers at one or more locations in supply chain network 100.

Database 114 may comprise one or more databases or other data storage arrangement at one or more locations, local to, or remote from, server 112. Database 114 comprises, for example, supply chain network models 220, supply chain states 222, bucketized data 224, KPI and SLA data 226, one or more probabilistic graphical models 228, training data 230, current data 232, target variables data 234, LASSO models data 236, features and classes data 238, pruned features data 240, bins data 242, and inferences data 242. Database 114 is illustrated and described as comprising supply chain network models 220, supply chain states 222, bucketized data 224, KPI and SLA data 226, one or more probabilistic graphical models 228, training data 230, current data 232, target variables data 234, LASSO models data 236, features and classes data 238, pruned features data 240, bins data 242, and inferences data 242, embodiments contemplate any suitable number or combination of these, located at one or more locations, local to, or remote from, PGM feature importance system 110 according to particular needs.

In one embodiment, probability module 202 of PGM feature importance system 110 constructs a graphical model from supply chain data, such as, for example, supply chain states 222 of the database of PGM feature importance system 110, historical data 248 of archiving system 120, data of database 154 of supply chain planner 150 (such as, for example, supply chain data 262 or inventory data 266), and the like. The graphical model may comprise, for example, a Bayesian network. Probability module 202 identifies attributes of the supply chain to represent in the graphical model from supply chain data 262 and which will be used for probabilistic graphical model 228 constructed by learning module 208, as described in further detail below. By way of example only and not by way of limitation, identified attributes may include inventory stock at a particular location, the current or average volume of orders for a particular product from a particular location, and the like. Probability module 202 may construct a graphical model in which each node represents one of the identified attributes. While constructing the graphical model, probability module 202 may generate edges connecting each node in the graph, with further refinement removing edges when learning module 208 calculates that they do not represent relationships present in supply chain data 262.

Inference and query engine 204 of PGM feature importance system 110 evaluates queries against a probabilistic graphical model. Inference and query engine 204 responds to queries formulated mathematically, that is, in a format compatible with probabilistic graphical model 228, such as, for example, query comprising one or more desired states for one or more metrics of the supply chain. Based on the requested desired states, inference and query engine 204 may traverse probabilistic graphical model 228 to determine changes to one or more attributes that would result in an increased probability of reaching the desired states. Inference and query engine 204 may respond to queries with recommendations of modifying the supply chain plan, applying a lever, or adjusting the supply chain to increase the probability of reaching a desired state. In some embodiments, inference and query engine 204 sends recommendations to supply chain planner 150, which automatically modifies the supply chain plan, applies a lever, or adjusts the supply chain to implement the recommendations.

Binning module 206 may assign one or more features and/or feature classes to one or more bins to group features and/or feature classes according to shared characteristics or outputs.

Learning module 208 of PGM feature importance system 110 refines the graphical model to generate probabilistic graphical model 228. Using one or more machine learning algorithms, learning module 208 identifies and models relationships between the nodes of the graphical model. Continuing the example above, when the graphical model is a Bayesian network, learning module 208 calculates the relationships between each node and stores a probability table for each node indicating the probabilistic relationship between related nodes. By way of explanation only and not by way of limitation, consider a simplified graphical model having two nodes, 'A,' and 'B.' If A is related to B, then the probability table for B will indicate the probability that B is true for both the situation that A is true and the situation that A is false. In addition, learning module 208 models probabilistic relationships between the nodes such as conditional probabilities, joint probabilities, and marginal probabilities. According to embodiments, learning module 208 learns the probability of an attribute given the probabilities of one or more related "upstream" attributes. Learning module 208 traverses the network of attribute nodes, and determines the structure of the relationships as well as the associated probabilities.

In an embodiment, pruning module 210 may prune one or more features and/or one or more feature classes to emphasize one or more more-important features and classes, as described in greater detail below.

According to embodiments, user interface module 212 receives and processes a user input, such as, for example, input received by the input device 172 of one or more computers. One or more computers 170 may transmit input to PGM feature importance system 110 using one or more communication links 181-189. User interface module 212 may register the input from one or more computers 170 and transmit the input to the modules and engines of PGM feature importance system 110. In an embodiment, user interface module 212 generates and displays a user interface (UI), such as, for example, a graphical user interface (GUI), that displays one or more interactive visualizations of data. User interface module 212 may generate one or more GUI displays. The one or more GUI displays may convey information, including supply chain plan data, segmentation data, and/or any other type of information about supply chain network 100 and segmentation. User interface module 212 display a GUI dashboard comprising visualizations of probabilistic graphical model 228, supply chain data, queries to probabilistic graphical model 228 as well as interactive visual elements that provide for user selection or adjustment of the values of variables to input into PGM feature importance system 110, or user entry of queries. In response to input from the user, PGM feature importance system 110 may calculate responses to queries including one or more recommendations of changes to be made to the supply chain via supply chain planner 150. Further, the dashboard may display results of the query indicating, for example the probability of reaching a desired state of the supply chain currently, and the probability of reaching a desired state of the supply chain if the system recommendations are implemented. As described in further detail below, embodiments of PGM feature importance system 110 provide a tool to identify the inputs having the greatest influence on one or more key performance indicators and may sort inputs.

Supply chain network models 220 represent the flow of materials through one or more supply chain entities 160 of supply chain network 100. As descried in more detail below, modeler 252 of planning module 250 of supply chain planner 150 may model the flow of materials through one or more supply chain entities 160 of supply chain network 100 as one or more supply chain network models 220 comprising a network of nodes and edges. The material storage and/or transition units are modelled as nodes, which may be referred to as, for example, buffer nodes, buffers, or nodes. Each node may represent a buffer for an item (such as, for example, a raw material, intermediate good, finished good, component, and the like), resource, or operation (including, for example, a production operation, assembly operation, transportation operation, and the like). Various transportation or manufacturing processes are modelled as edges connecting the nodes. Each edge may represent the flow, transportation, or assembly of materials (such as items or resources) between the nodes by, for example, production processing or transportation. A planning horizon for supply chain network 100 models may be broken down into elementary time-units, such as, for example, time-buckets, or, simply, buckets. The edge between two buffer nodes may denote processing of material and the edge between different buckets for the same buffer may indicate inventory carried forward. Flow-balance constraints for most, if not every buffer in every bucket, model the material movement in supply chain network 100. Supply chain network models 220 may include any dynamic supply chain data, including for example, the one or more material constraints, one or more capacity constraints, lead times, yield rates, inventory levels, safety stock, demand dates, and/or the like. Although supply chain network models 220 are illustrated and described as comprising a network of nodes and edges, embodiments contemplate supply chain network models 220 comprising any suitable model that represents one or more components of supply chain network 100 using any suitable model, according to particular needs.

According to embodiments, supply chain network models 220 may model and display supply chain data stored in supply chain planner 150 database 154 and/or archiving system 120 database 124. In an embodiment, supply chain network model 220 may model the flow of materials from upstream nodes to downstream nodes along each of the edges from left to right from, for example, raw materials to finished products. However, flows may be bidirectional, and one or more materials may flow from right to left, from a downstream node to an upstream node. Supply chain network 100 represented by supply chain network model 220 comprises material buffers storing materials or items, operations for processing materials and items, and resources which represent capacity limitations on each of the operations to which they are connected. Operations may have a single material or item as input and a single material or item as output. In addition, or as an alternative, a single operation may require two or more materials or items as input (i.e. materials or items stored at buffers) and produces one or more items as output (materials or items stored at buffers).

Supply chain network 100 represented by supply chain network model 200 may begin at the most upstream nodes representing material buffers, such as, for example, raw material buffers. Raw material buffers may receive the initial input for a manufacturing process. For example, raw materials may comprise metal, fabric, adhesives, polymers, and other materials and compounds required for manufacturing. The flow of materials from the upstream material buffers is indicated by the edges, which identify which of the operations is a possible destination for the materials. For example, raw materials may be transported to operations comprising a production process, such as producing one or more intermediate items from the raw materials which are stored at material buffers comprising, for example, intermediate items buffers. The operations are coupled by the edges with the resources to indicate that the operations require the resource in order to process items or materials. According to embodiments, the resources may include, for example, particular manufacturing, distribution, or transportation equipment and facilities, and other such resources utilized in the supply chain.

Limitations on supplying materials and items to particular buffers may represent transportation limitations (e.g. cost, time, available transportation options) or outputs of various operations (such as, for example, different production processes, which produce different items, each of which may be represented by a different SKU, and which each may be stored at different buffers). Although the limitation of the flow of items between nodes of supply chain network model 220 is described as cost, timing, transportation, or production limitations, embodiments contemplate any suitable flow of items or limitations of the flow of items between any one or more different nodes of a supply chain network, according to particular needs. For example, in a manufacturing supply chain network, transportation processes may transport, package, or ship finished goods to one or more locations internal to or external of one or more supply chain entities 160 of supply chain network 100, including, for example, shipping directly to consumers, to regional or strategic distribution centers, or to the inventory of one or more supply chain entities 160, including, for example, to replenish a safety stock for one or more items in an inventory of one or more supply chain entities 160. Particular items and processes described herein comprise a simplified description for the purpose of illustration. For example, the items may be different sizes, styles, states of same or different physical material. Similarly, a process may be any process or operation, including manufacturing, distribution, transportation, or any other suitable activity of supply chain network 100. In one embodiment, additional constraints, such as, for example, business constraints, operation constraints, and resource constraints, may be added to facilitate other planning rules.

Although, a simplified supply chain network model 220 is illustrated and described as having a particular number of buffers, resources, and operations with a defined flow between them, embodiments contemplate any number of buffers, resources, and operations with any suitable flow between them, including any number of nodes and edges, according to particular needs. In particular, a supply chain planning problem typically comprises supply chain networks much more complex than the simplified supply chain network models 220 described above. For example, a supply chain network often comprises multiple manufacturing plants located in different regions or countries. In addition, an item may be processed by many operations into a large number of different materials and items, where the different operations may have multiple constrained resources and multiple input items, each with their own lead, transportation, production, and cycle times. In addition, material may flow bidirectionally (either, upstream or downstream).

Supply chain states 222 of database 114 may comprise various metrics and data points representing the current state of the supply chain and historical states of the supply chain. Supply chain states 222 may include data collected from locations of the supply chain such as the stock of inventory at a location, the safety stock of inventory at a location, the total volume of demand for products in the supply chain, the demand at particular product/location combinations in the supply chain, and/or the like. In addition, or as an alternative, supply chain states 222 include various metrics measuring the performance of the supply chain, such as one or more KPIs or SLAs. In other embodiments, the data pertaining to KPIs and SLAs (or other target metrics) may be separately stored as KPI and SLA data. Supply chain states 222 may be used by probability module 202 to construct a graphical model of the supply chain represented by supply chain states 222.

According to embodiments, data representing supply chain states 222 may be bucketized by probability module 202 and stored as bucketized data. Probability module 202 may bucketize the data based on a functional grouping of the data in supply chain states 222. For example, probability module 202 may place all data points related to inventory stock into a "stock" bucket. Bucketized data 224 may further have one or more restrictions modeled that prevent data in one bucket having an effect on data in another bucket type. For example, if data is sorted into four temporal buckets (past, current, future, and time-agnostic), then restrictions are included in the model to prevent current data effecting past data and future data effecting current or past data. When using time-bucketized data to construct a probabilistic graphical model, past data nodes will be upstream of current data nodes, and current data nodes will be upstream of future data nodes.

KPI and SLA data 226 may relate to a current or historical state of a supply chain and its performance. According to embodiments, learning module 208 may use KPI and SLA data 226, in conjunction with supply chain states 222 and/or one or more machine learning LASSO models stored in LASSO models data 236, to predict the probability of a particular KPI or SLA being attained based on the state of the supply chain. In addition, or in the alternative, learning module 208 creates and/or adjusts probabilistic graphical model 228 based, at least in part, on the predicted probabilities of attaining particular KPIs or SLAs.

Probabilistic graphical model 228 is, as disclosed above, a graph-based model, such as a Bayesian network, constructed to model the relationship and effect of attributes on the KPIs, SLAs, or other metrics of a supply chain. Probability module 202 constructs a graphical model based on supply chain states 222, bucketized data, and/or bins data. Learning module 208 refines the graphical model by learning the probabilistic relationships between the nodes to construct probabilistic graphical model 228. In an embodiment, PGM feature importance system 110 uses probabilistic graphical model 228 to respond to queries and make recommendations of changes to the supply chain to improve the probability of meeting one or more desired metrics, such as the KPIs or SLAs.

According to embodiments, probabilistic graphical model 228 may comprise a probabilistic database composed of probability tables for the attributes of supply chain network 100. PGM feature importance system 110 may receive one or more queries, and the probabilistic database may respond to the queries by providing one or more insights. According to one embodiment, the query is sent to the probabilistic database. By way of further explanation only and not by way of limitation, the query may, for example, request, when given a first attribute in a first range, and a second attribute desired to be in a second range, the values for one or more other attributes. The response to the query provided by traversing the probabilistic database may be referred to as an inference or an insight into the way supply chain network 100 operates.

Training data 230 is used by probability module 202 and learning module 208 to train probabilistic graphical model 228. Training data 230 may include data such as supply chain states 222, bucketized data 224, KPI and SLA data 226, or other data related to the supply chain. In one embodiment, binning module 206 uses training data 230 to determine features and classes data 238 for the attributes of the supply chain, based on the historical correlations between the attributes and the KPIs or the SLAs of the supply chain.

Current data 232 may comprise data received by PGM feature importance system 110 representing a current or near-current state of the supply chain. For example, current data 232 may be received by PGM feature importance system 110, such as via supply chain planner 150, on a periodic basis. In other embodiments, current data 232 may be received by PGM feature importance system 110 as part of a query sent to inference and query engine 204. Current data 232 may include data such as supply chain states 222, bucketized data 224, or other data related to the supply chain.

Target variables data 234 may comprise data related to one or more target variables selected by PGM feature importance system 110 for which to determine whether the selected target variable will achieve a particular value. LASSO models data 236 comprises one or more LASSO machine learning models which learning module 208 may use to analyze training data 230 and/or current data 232 and to identify features and classes important to one or more selected target variables.

Features and classes data 238 may comprise one or more features and/or feature classes identified by learning module 208 and the one or more LASSO machine learning models during the actions of the method described below. Embodiments contemplate grouping features into any suitable classes and/or categories using, for example, K percentile features (ranking the features according to the K percentile), top K % contributors (ranking the features according to the top K %), functional grouping (dictionary mapping to relate features placed together in a category such as, for example, business knowledge), and the like. Although particular methods of feature classification and/or categorization are illustrated and described, embodiments contemplate using other suitable feature categorization methods, according to particular needs.

Pruned features data 240 may store one or more pruned features and/or feature classes, generated by pruning module 210. Bins data 242 may store one or more bins, generated by binning module 206, into which binning module 206 may sort one or more pruned features and/or feature classes. Inferences data 244 may store one or more inferences, generated by inference and query engine 204 using pruned features data 240, bins data 242, and/or other data, about the one or more selected target variables.

As disclosed above, archiving system 120 comprises server 122 and database 124. Although archiving system 120 is illustrated as comprising a single server 122 and a single database 124, embodiments contemplate any suitable number of servers or databases internal to or externally coupled with archiving system 120.

Serve 122 comprises data retrieval module 246. Although server 122 is illustrated and described as comprising a single data retrieval module 246, embodiments contemplate any suitable number or combination of data retrieval modules 246 located at one or more locations, local to, or remote from archiving system 120, such as on multiple servers or computers at one or more locations in supply chain network 100.

In one embodiment, data retrieval module 246 of archiving system 120 receives historical data 248 from transportation network 140, warehouse management system 143, inventory system 146, supply chain planner 150, and one or more supply chain entities 160 and stores received historical data 248 in database 124. According to one embodiment, data retrieval module 246 may prepare historical data 248 for use by supply chain planner 150 to generate variants of the supply chain planning problem by checking the historical supply chain data for errors and transforming the historical supply chain data to normalize, aggregate, and/or rescale the historical supply chain data to allow direct comparison of data received from different transportation networks 140, warehouse management systems 143, inventory systems 146, supply chain planners 150, and one or more supply chain entities 160 at one or more other locations local to, or remote from, archiving system 120. According to embodiments, data retrieval module 146 receives data from one or more sources external to supply chain network 100, such as, for example, weather data, special events data, social media data, calendars, and the like and stores the received data as historical data 248.

Database 122 may comprise one or more databases or other data storage arrangement at one or more locations, local to, or remote from, the server. Database 122 comprises, for example, historical data 248. Although the database 122 is illustrated and described as comprising historical data 248, embodiments contemplate any suitable number or combination of data, located at one or more locations, local to, or remote from, archiving system 120, according to particular needs.

Historical data 248 is received from PGM feature importance system 110, archiving system 120, transportation network 140, warehouse management system 143, inventory system 146, supply chain planner 150, one or more supply chain entities 160, computer 170, and/or one or more locations local to, or remote from, supply chain network 100, such as, for example, weather data, special events data, social media data, calendars, and the like. According to one embodiment, historical data 248 comprises historic sales patterns, prices, promotions, weather conditions and other factors influencing demand of one or more items sold in one or more stores over a time period, such as, for example, one or more days, weeks, months, years, including, for example, a day of the week, a day of the month, a day of the year, week of the month, week of the year, month of the year, special events, paydays, and the like. When generating variants of the supply chain planning problem, supply chain planner 150 may calculate supply chain plans over a historical time period, such as, for example, any of the time periods represented by historical data 248.

As disclosed above, supply chain planner 150 may comprise server 152 and database 154. Although supply chain planner 150 is illustrated as comprising a single server 152 and a single database 154, embodiments contemplate any suitable number of servers 152 or databases 154 internal to or externally coupled with supply chain planner 150.

Server 152 comprises planning module 250, execution module 256, and user interface module 258. Although server 152 is illustrated and described as comprising a single planning module 250, a single execution module 256, and a single user interface module 258, embodiments contemplate any suitable number or combination of planning modules 250, execution modules 256, and user interface modules 258, located at one or more locations, local to, or remote from supply chain planner 150, such as on multiple servers or computers at one or more locations in supply chain network 100.

Database 154 of supply chain planner 150 may comprise one or more databases or other data storage arrangement at one or more locations, local to, or remote from, server 152. Database 154, for example, transaction data 260, supply chain data 262, product data 264, inventory data 266, inventory policies 268, store data 270, customer data 272, supply chain models 274, and levers 276. Although database 154 is illustrated and described as comprising transaction data 260, supply chain data 262, product data 264, inventory data 266, inventory policies 266, store data 270, customer data 272, supply chain models 274, and levers 276, embodiments contemplate any suitable number or combination of data, located at one or more locations, local to, or remote from, supply chain planner 150, according to particular needs.

Planning module 250 comprises modeler 252 and solver 254. Although planning module 250 is illustrated and described as comprising a single modeler 252 and a single solver 254, embodiments contemplate any suitable number or combination of these located at one or more locations, local to, or remote from planning module 250, such as on multiple servers or computers at any location in supply chain network 100.

Modeler 252 may model one or more supply chain planning problems of supply chain network 100. According to one embodiment, modeler 252 of server 150 identifies resources, operations, buffers, and pathways, and maps supply chain network 100 using supply chain network models 220, as disclosed above. For example, modeler 252 models a supply chain planning problem that represents supply chain network 100 as supply chain network model 220, an LP optimization problem, or other type of input to a supply chain solver. As disclosed above, embodiments contemplate modeler 252 providing supply chain network 100 model to PGM feature importance system 110.

According to embodiments, solver 254 of planning module 250 generates a solution to a supply chain planning problem. Solver 254 may comprise an LP optimization solver, a heuristic solver, a mixed-integer problem solver, a MAP solver, an LP solver, a Deep Tree solver, and the like.

Execution module 256 executes one or more supply chain processes such as, for example, instructing automated machinery (i.e., robotic warehouse systems, robotic inventory systems, automated guided vehicles, mobile racking units, automated robotic production machinery, robotic devices and the like) to adjust product mix ratios, inventory levels at various stocking points, production of products of manufacturing equipment, proportional or alternative sourcing of one or more supply chain entities 160, and the configuration and quantity of packaging and shipping of items based on a supply chain plan, the number of items currently in stock at one or more supply chain entities 160, the number of items currently in transit in the transportation network, a forecasted demand, a supply chain disruption, a material or capacity reallocation, current and projected inventory levels at one or more stocking locations, bins data 242, selected lever 276, and/or one or more additional factors described herein. For example, execution module 256 may send instructions to the automated machinery to locate items to add to or remove from an inventory of or shipment for one or more supply chain entities 160.

User interface module 258 of supply chain planner 150 generates and displays a UI, such as, for example, a GUI, that displays one or more interactive visualizations of transaction data 260, supply chain data 262, product data 264, inventory data 266, inventory policies 266, store data 270, customer data 272, supply chain models 274, and levers 276. According to embodiments, user interface module 258 displays a GUI comprising interactive graphical elements for selecting one or more supply chain network components, modeling supply chain network 100 as an object model, formulating supply chain network 100 as a supply chain planning problem, solving the supply chain planning problem, displaying predictions from PGM feature importance system 110, displaying and providing for selection of one or more levers 276, and displaying one or more solutions or supply chain plans.

Transaction data 260 may comprise recorded sales and returns transactions and related data, including, for example, a transaction identification, time and date stamp, channel identification (such as stores or online touchpoints), product identification, actual cost, selling price, sales volume, customer identification, promotions, and or the like. In addition, transaction data 260 is represented by any suitable combination of values and dimensions, aggregated or un-aggregated, such as, for example, sales per week, sales per week per location, sales per day, sales per day per season, or the like.

Supply chain data 262 may comprise any data of one or more supply chain entities 160 including, for example, item data, identifiers, metadata (comprising dimensions, hierarchies, levels, members, attributes, cluster information, and member attribute values), fact data (comprising measure values for combinations of members) of one or more supply chain entities 160. Supply chain data 262 may also comprise for example, various decision variables, business constraints, goals, and objectives of one or more supply chain entities 160. According to some embodiments, supply chain data 262 may comprise hierarchical objectives specified by, for example, business rules, master planning requirements, scheduling constraints, and discrete constraints, including, for example, sequence dependent setup times, lot-sizing, storage, shelf life, and the like.

Product data 264 of database 154 may comprise products identified by, for example, a product identifier (such as a Stock Keeping Unit (SKU), Universal Product Code (UPC) or the like), and one or more attributes and attribute types associated with the product ID. Product data 264 may comprise data about one or more products organized and sortable by, for example, product attributes, attribute values, product identification, sales volume, demand forecast, or any stored category or dimension. Attributes of one or more products may be, for example, any categorical characteristic or quality of a product, and an attribute value may be a specific value or identity for the one or more products according to the categorical characteristic or quality, including, for example, physical parameters (such as, for example, size, weight, dimensions, color, and the like).

Inventory data 266 of database 154 may comprise any data relating to current or projected inventory quantities or states, order rules, or the like. For example, inventory data 266 may comprise the current level of inventory for each item at one or more stocking points across supply chain network 100. In addition, inventory data 266 may comprise order rules that describe one or more rules or limits on setting an inventory policy, including, but not limited to, a minimum order volume, a maximum order volume, a discount, and a step-size order volume, and batch quantity rules. According to some embodiments, the planning and execution system accesses and stores inventory data 266 in database 154, which may be used by supply chain planner 150 to place orders, set inventory levels at one or more stocking points, initiate manufacturing of one or more components, or the like in response to, and based at least in part on, a supply chain plan or other output of supply chain planner 150. In addition, or as an alternative, inventory data 266 may be updated by receiving current item quantities, mappings, or locations from transportation network 140, warehouse management system 143, inventory system 146, supply chain planner 150, and/or one or more networked imaging devices 130.

Inventory policies 266 may comprise any suitable inventory policy describing the reorder point and target quantity, or other inventory policy parameters that set rules for the planning and execution system to manage and reorder inventory. Inventory policies 266 may be based on target service level, demand, cost, fill rate, or the like. According to embodiment, inventory policies 266 comprise target service levels that ensure that a service level of one or more supply chain entities 160 is met with a certain probability. For example, one or more supply chain entities 160 may set a service level at 95%, meaning one or more supply chain entities 160 will set the desired inventory stock level at a level that meets demand 95% of the time. Although, a particular service level target and percentage is described; embodiments contemplate any service target or level, for example, a service level of approximately 99% through 90%, a 75% service level, or any suitable service level, according to particular needs. Other types of service levels associated with inventory quantity or order quantity may comprise, but are not limited to, a maximum expected backlog and a fulfillment level. Once the service level is set, PGM feature importance system 110 and/or supply chain planner 150 may determine a replenishment order according to one or more replenishment rules, which, among other things, indicates to one or more supply chain entities 160 to determine or receive inventory to replace the depleted inventory. By way of example and not of limitation, inventory policy 266 for non-perishable goods with linear holding and shorting costs comprises a min./max. (s,S) inventory policy. Other inventory policies 266 may be used for perishable goods, such as fruit, vegetables, dairy, fresh meat, as well as electronics, fashion, and similar items for which demand drops significantly after a next generation of electronic devices or a new season of fashion is released.

Store data 270 may comprise data describing the stores of one or more retailers and related store information. Store data 270 may comprise, for example, a store ID, store description, store location details, store location climate, store type, store opening date, lifestyle, store area (expressed in, for example, square feet, square meters, or other suitable measurement), latitude, longitude, and other similar data. Store data 270 may include demand forecasts for each store indicating future expected demand based on, for example, any data relating to past sales, past demand, purchase data, promotions, events, or the like of one or more supply chain entities 160. The demand forecasts may cover a time interval such as, for example, by the minute, hour, daily, weekly, monthly, quarterly, yearly, or any suitable time interval, including substantially in real time. Although demand forecasts are described as comprising a particular store, the planning and execution system may calculate a demand forecast at any granularity of time, customer, item, region, or the like.

Customer data 272 may comprise customer identity information, including, for example, customer relationship management data, loyalty programs, and mappings between one or more customers and transactions associated with those one or more customers such as, for example, product purchases, product returns, customer shopping behavior, and the like. Customer data 272 may comprise data relating customer purchases to one or more products, geographical regions, store locations, time period, or other types of dimensions.

Supply chain models 274 comprise characteristics of a supply chain setup to deliver the customer expectations of a particular customer business model. These characteristics may comprise differentiating factors, such as, for example, MTO (Make-to-Order), ETO (Engineer-to-Order) or MTS (Make-to-Stock). However, supply chain models 274 may also comprise characteristics that specify the supply chain structure in even more detail, including, for example, specifying the type of collaboration with the customer (e.g. Vendor-Managed Inventory (VMI)), from where products may be sourced, and how products may be allocated, shipped, or paid for, by particular customers. Each of these characteristics may lead to a different supply chain model.

Figure 3:
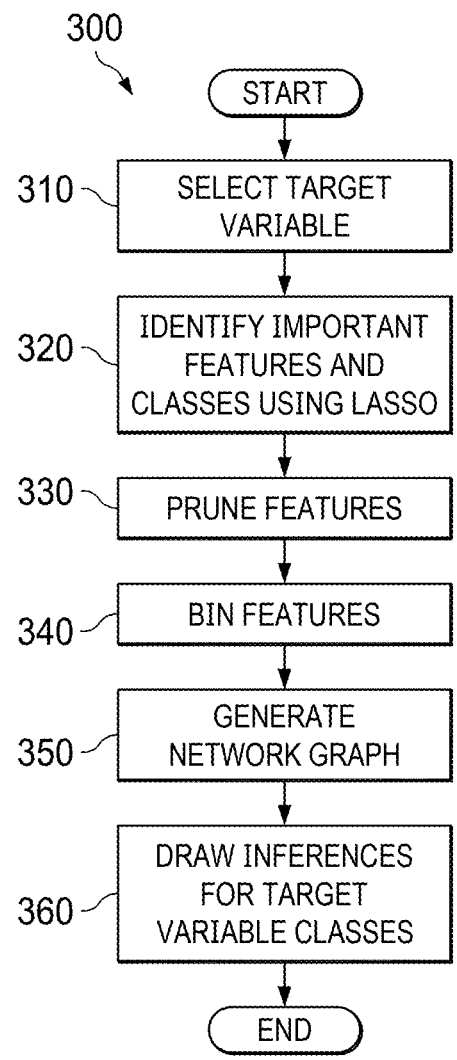
FIG. 3 illustrates a method of identifying features and/or feature classes to determine whether a target variable will achieve a particular value, according to an embodiment.

FIG. 3 illustrates method 300 of identifying features and/or feature classes relevant to determining whether a selected target variable will achieve a particular value, according to an embodiment. Method 300 comprises one or more actions, which although described in a particular order may be implemented in one or more combinations, according to particular needs.

At first action 310, PGM feature importance system 110 selects a target variable. User interface module 212 may respond to input to one or more computer input devices 172 that selects one or more target variables that may be present in supply chain network models 220, KPI and SLA data 226, training data 230, and/or current data 232. In response to this selection of one or more target variables, inference and query engine 204 stores the target variable in target variables data 234.

At second action 320, PGM feature importance system 110 identifies features relevant to the target variable using a LASSO machine learning model. In an embodiment, learning module 208 accesses one or more LASSO machine learning models stored in LASSO models data 236. Learning module 208 applies training data 230, current data 232, and/or the selection of target variables stored in target variables data 234 to the one or more LASSO machine learning models to analyze training data 230 and current data and to identify features important to the target variables. Learning module 208 stores the identified features in features and classes data 238.

At third action 330, PGM feature importance system 110 prunes the identified features. In an embodiment, PGM feature importance system 110 may identify, at the second action, hundreds of features. At third action 330, pruning module 210 prunes the features so that only the most important features remain. Pruning module 210 may access the features stored in features and classes data 238, and prunes the features by removing the least-important features. According to embodiments, pruning module 210 may prune the features by any degree of reduction, such as, for example, pruning 10% of the features (leaving 90% of the original features remaining), pruning 50% of the features (leaving 50% of the original features remaining), or by pruning any other percentage of the original features. Pruning module 210 stores the remaining pruned features in pruned features data 240.

At fourth action 340, PGM feature importance system 110 bins the features. Binning module 206 of PGM feature importance system 110 may access the pruned features stored in pruned features data 240, and may assign each feature and class to a bin. In an embodiment, binning module 206 may assign pruned features to bins in order to equalize the distribution of the pruned features across the bins. For example, in an embodiment in which there are 100 pruned features, each of which has a numerical value of between 1 and 1,000, binning module 206 may generate 10 bins to separate the 100 pruned features so that 10 pruned features end up in each of the 10 bins. Binning module 206 may expand and contract the size of the bins (for example, by making Bin 1 accept all pruned features with a numerical value of between 1 and 400, making Bin 2 accept all pruned features with a numerical value of between 401 and 450, and so on) so that each of the 10 bins comprises 10 pruned features, thereby equally distributing all 100 of the pruned features across all 10 bins. Having generated bins for the pruned features, binning module 206 stores the bins in bins data 242.

At fifth action 350, PGM feature importance system 110 generates a network graph. In an embodiment, probability module 202 and learning module 208 access the pruned features stored in pruned features data 240, and the bins stored in bins data 242. Probability module 202 and learning module 208 may use the pruned features, classes, and bins to generate a probabilistic graphical model, including but not limited to a Bayesian network, that is comprised of a comparatively small number of pruned and important features. Learning module 208 stores the generated probabilistic graphical model in probabilistic graphical model 228 data of the database.

At sixth action 360, PGM feature importance system 110 draws inferences about the target variable using the generated probabilistic graphical model and pruned features, classes, and bins. Inference and query engine 204 accesses the generated probabilistic graphical model, pruned features, and bins, and uses the generated probabilistic graphical model, pruned features, and bins to draw one or more inferences about the target variable stored in target variables data 234. Inference and query engine 204 may store the one or more inferences in the inferences data. User interface module 212 may access inferences data 244 and may display the inferences using one or more GUI displays. PGM feature importance system 110 then terminates method 300.

To illustrate PGM feature importance system 110 executing the actions of method 300 to identify features and/or feature classes relevant to determining whether a selected target variable will achieve a particular value, the following example is provided. In this example, and as described in greater detail below, PGM feature importance system 110 identifies the 15 most important features across 3 feature classes for a selected SLA sales target variable. Although a particular example of PGM feature importance system 110 identifying features and/or feature classes relevant to determining whether a selected target variable will achieve a particular value is provided herein, embodiments contemplate PGM feature importance system 110 executing any methods with any actions in any order, according to particular needs.

In this example, at first action 310, PGM feature importance system 110 selects a target variable. User interface module 212 responds to input to one or more computer input devices 172 that selects, as the target variable, whether a particular supply chain retailer (in this example, "Retailer X") will be able to sell sufficient goods in the month of June 2021 so as to meet all Retailer X service level agreement (SLA) sales targets for June 2021 (henceforth, "SLA Sales Targets"). In response to this target variable selection, inference and query engine 204 stores the selection of the SLA Sales Targets variable in target variables data 234.

Continuing the example, at second action 320, PGM feature importance system 110 identifies features and feature classes relevant to the SLA Sales Targets variable using a LASSO machine learning model. In this example, learning module 208 accesses a LASSO machine learning model stored in LASSO models data 236. Learning module 208 applies training data 230, current data 232, and the selection of the SLA Sales Targets variable stored in target variables data 234 to the LASSO machine learning model to analyze training data 230 and current data and to identify features important to the SLA Sales Targets variable. In this example, learning module 208 and the LASSO machine learning model identify features across 3 classes as being the most relevant features for the SLA Sales Targets variable. Learning module 208 stores the identified features in the features data. In this example, user interface module 212 accesses the identified features stored in the features data, and generates a features display to display the identified features using one or more output devices 174.

Figure 4A:
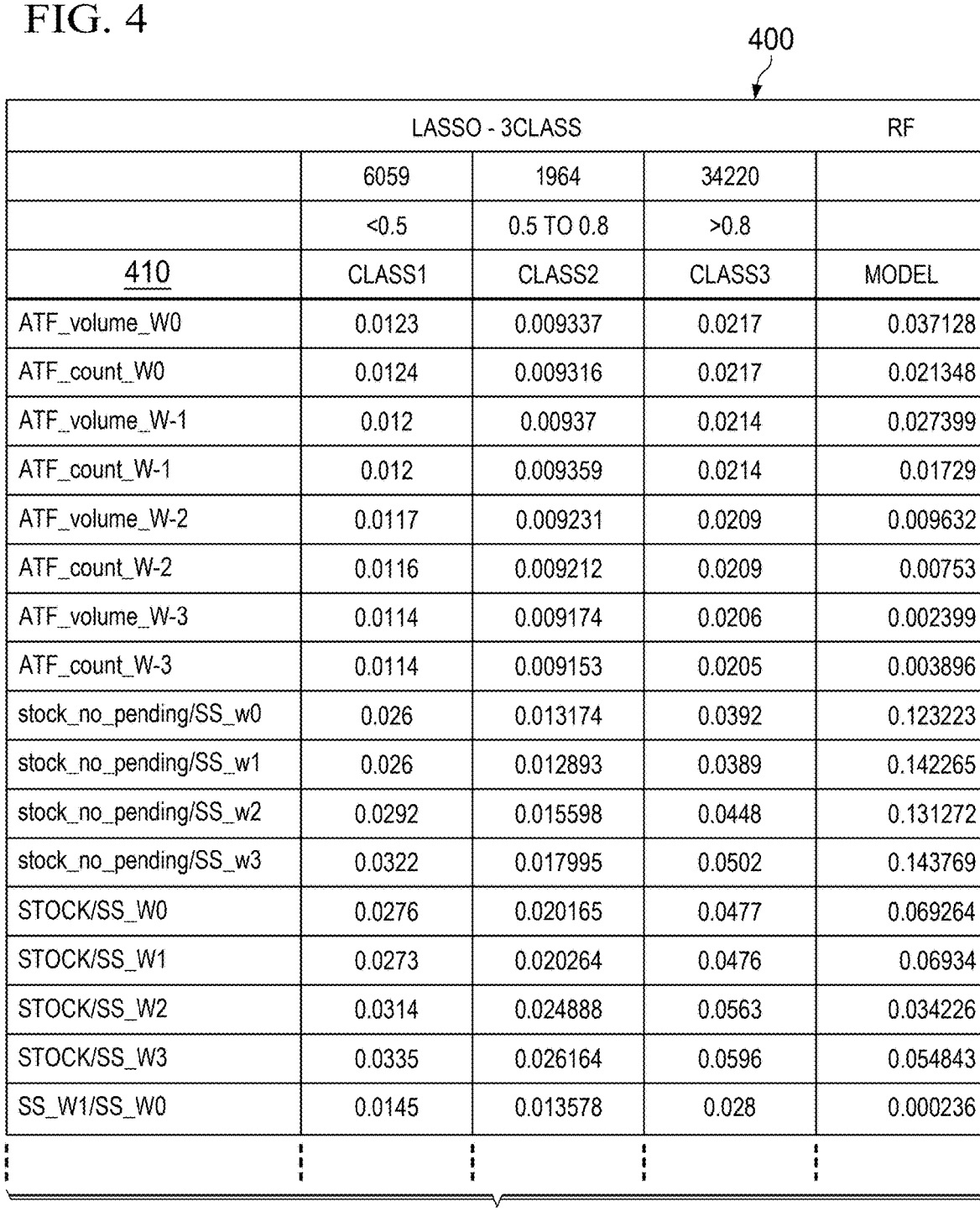

FIGS. 4A-4B illustrate features display 400, according to an embodiment.

Continuing the example, features display 400 displays coefficient values for features 410 associated with exemplary SLA Sales Targets variable across three classes, identified by learning module 208 and the LASSO machine learning model. Although FIGS. 4A-4B illustrate features display 400 in a particular configuration, embodiments contemplate PGM feature importance system 110 generating features displays in any configuration and displaying any data, according to particular needs.

Continuing the example, and as illustrated by FIGS. 4A-4B, features display 400 displays several features 410 (beginning with ATF_volume_W0, and then followed by ATF_count_W0, ATF_volume_W−1, and so on), including feature coefficients for each of three feature classes (for example, for feature ATF_volume_W0, Class 1 equals 0.0123, Class 2 equals 0.009337, and Class 3 equals 0.0217) and a Random Forest (RF_column for each feature (for feature ATF_volume_W0, equaling 0.037128, for example). In an embodiment, features display 400 may comprise and display two distinct ways of extracting important features: (1) using LASSO coefficients for each class, and (2) using feature importance from random forests using one or more standard sklearn libraries.

Continuing the example, at third action 330, PGM feature importance system 110 prunes the identified features and feature classes. In this example, pruning module 210 prunes the features stored in the features data so that only the most important 15 features across the 3 classes remain. In other embodiments, pruning module 210 may prune any number of features, according to particular needs. Pruning module 210 stores the remaining 15 pruned features across the 3 classes in pruned features data 240.

Continuing the example, at fourth action 340, PGM feature importance system 110 bins the features. In this example, binning module 206 uses an algorithm, the actions of which are described in FIG. 6 below, to generate bins for the 15 pruned features and 3 classes and to assign the 15 pruned features and 3 classes to the generated bins. In other embodiments not illustrated by this example, binning module 206 may use any algorithms, functions, and/or other methods to calculate feature importance. In this example, having generated bins for the 15 pruned features and 3 classes, binning module 206 stores the bins in bins data 242.

Continuing the example, at fifth action 350, PGM feature importance system 110 generates a network graph. In this example, probability module 202 and learning module 208 access the 15 pruned features and 3 classes stored in pruned features data 240, and the bins stored in bins data 242. Probability module 202 and learning module 208 may use the 15 pruned features, 3 classes, and bins to generate a probabilistic graphical model, including but not limited to a Bayesian network, that is comprised of a comparatively smaller number of pruned and important features. Learning module 208 stores the generated probabilistic graphical model in probabilistic graphical model 228 data of the database.

Continuing the example, at sixth action 360, PGM feature importance system 110 draws inferences about the target variable using the generated probabilistic graphical model and 15 pruned features, 3 classes, and generated bins. Inference and query engine 204 accesses the generated probabilistic graphical model, 15 pruned features and 3 classes, and bins, and uses the generated probabilistic graphical model, 15 pruned features and 3 classes, and bins to draw one or more inferences about the Selected Targets variable stored in target variables data 234. Inference and query engine 204 may store the one or more inferences in the inferences data. User interface module 212 may access inferences data 244 and may display the inferences using one or more GUI displays, illustrated by FIGS. 5A and 5B below. PGM feature importance system 110 then terminates the method.

Figure 5A:
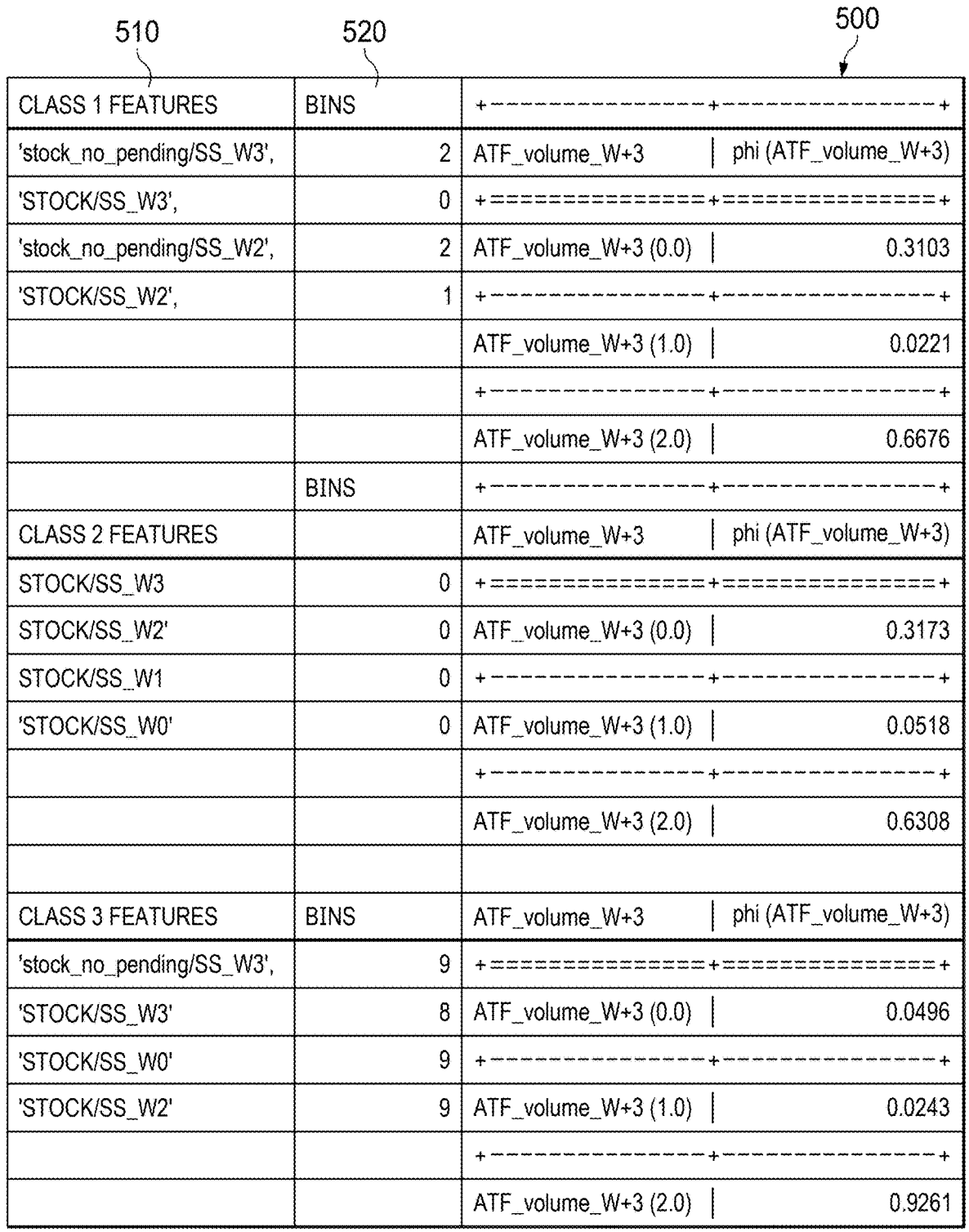
FIG. 5A illustrates a first graphical user interface display, according to an embodiment.
Figure 5B:
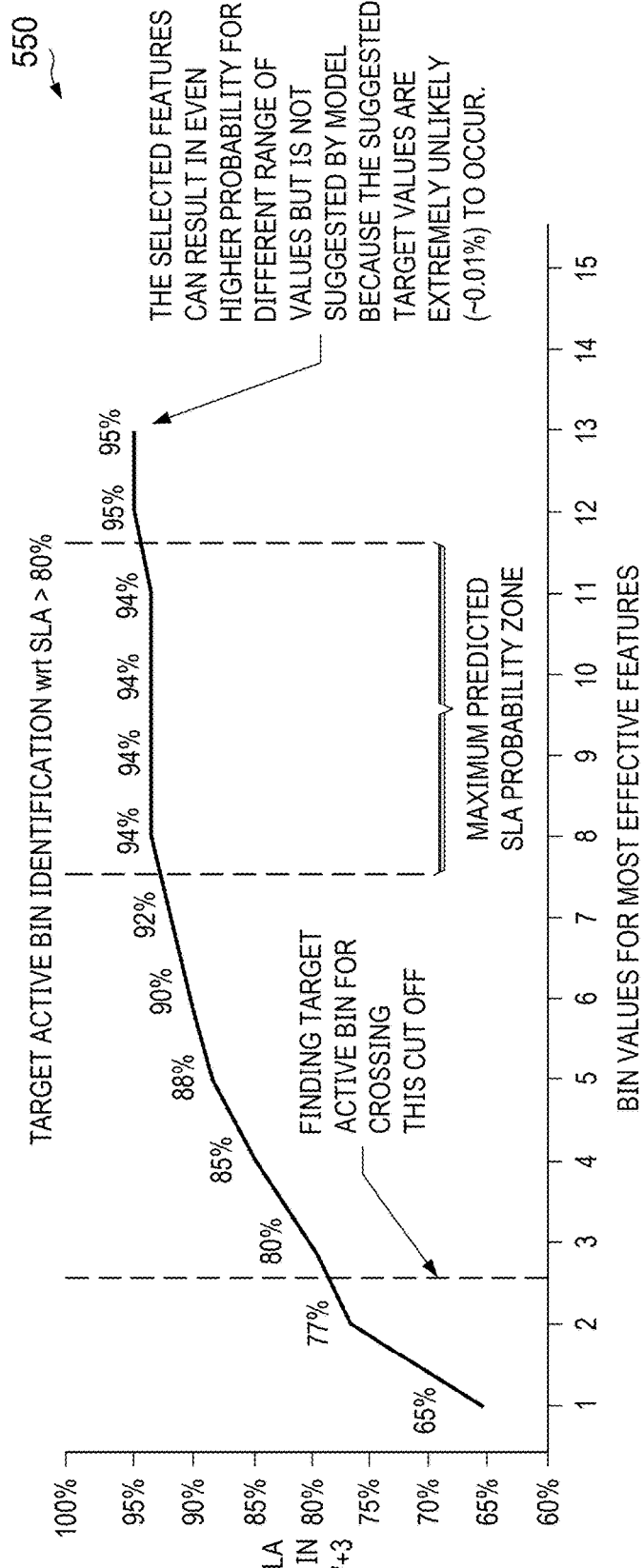
FIG. 5B illustrates a second graphical user interface display, according to an embodiment.

FIGS. 5A and 5B illustrate first GUI display 500 and second GUI display 550, respectively, illustrating the 15 pruned features, 3 classes, and selected bins. First GUI display 500 illustrates particular features 510 (such as, for example, 'stock_no_pending/SS_W3' and 'STOCK/SS_W3') assigned to particular bins 520. Second GUI display 550 illustrates particular combinations of bins and features 560 from which PGM feature importance system 110 may draw relevant inferences, and which may contribute to or influence the ability of, in the continued example, Supplier X meeting all SLA Sales Targets for June 2021. Although particular configurations of first GUI display 500 and second GUI display 550 are illustrated by FIGS. 5A and 5B, embodiments contemplate PGM feature importance system 110 generating any form of GUI displays that display any information stored in PGM feature importance system 110 database 112, archiving system 120 database 114, and/or supply chain planner 150 database, according to particular needs.

Figure 6:
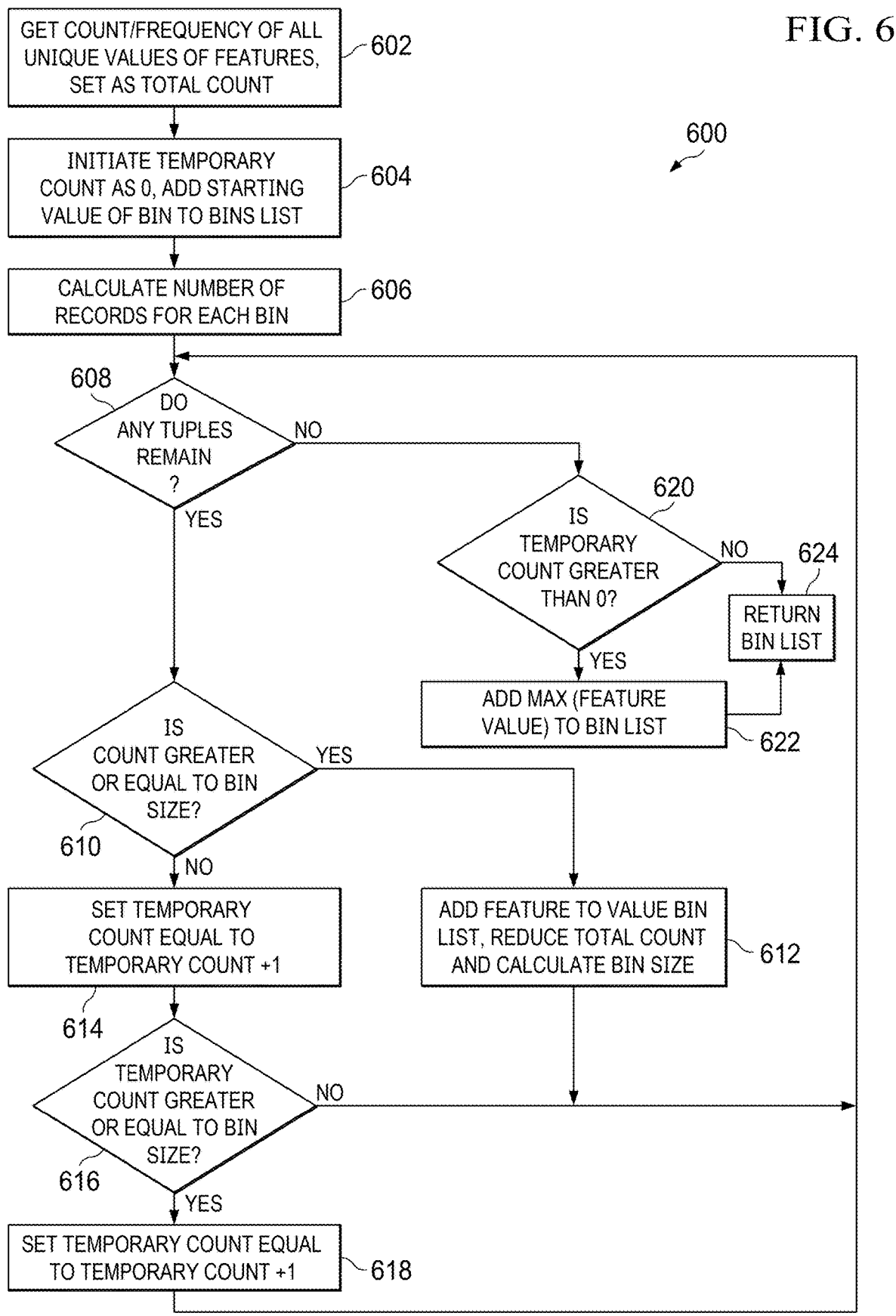
FIG. 6 illustrates an example method for binning features.

FIG. 6 illustrates example method 600 for binning features. The method comprises one or more actions, which although described in a particular order may be implemented in one or more combinations, according to particular needs.

At first action 602, when given the features values and the desired number of bins, PGM feature importance system 110 gets the count and/or frequency of all unique values of all features, and then saves the number of records as a total count variable.

At second action 604, PGM feature importance system 110 initiates the temporary count by setting temporary count to 0. PGM feature importance system 110 also sets the starting value of the bin to the minimum value of feature minus 1. PGM feature importance system 110 adds this value to the bins list.

At third action 606, PGM feature importance system 110 calculates the number of records for each bin. In method 600, the number of records in the bin (in other words, the bin size) may be set to equal the total count variable divided by the desired number of bins.

At fourth action 608, PGM feature importance system 110 begins iterating through a set of tuples. The set of tuples may comprise feature, value, and count. If there are tuples remaining to be looped through, method 600 proceeds to fifth action 610.

At fifth action 610, PGM feature importance system 110 determines if the count is greater than or equal to bin size, as calculated at third action 606. If the count is greater than or equal to the bin size, method 600 proceeds to sixth action 612, where PGM feature importance system 110 adds the feature value to the bin list. Also at sixth action 612, PGM feature importance system 110 reduces the total count variable by 1 and calculates a new bin size. Resetting the bin size may allow PGM feature importance system 110 to distribute the remaining values into remaining bins equally. PGM feature importance system 110 may decrement the values for the total count variable and the desired number of bins, and set bin size to equal the decremented total count variable divided by the decremented number of bins. After sixth action 612, method 600 returns to fourth action 608.

Returning to fifth action 610, if the count is less than the bin size, method 600 proceeds to seventh action 614, where PGM feature importance system 110 sets the temporary count variable equal to the temporary count variable plus 1, in other words, incrementing the temporary count variable.

At eighth action 616, PGM feature importance system 110 determines if the temporary count variable is greater than or equal to the bin size. If so, method 600 proceeds to ninth action 618, where PGM feature importance system 110 increments the temporary count variable. Then, method 600 returns to fourth action 608. Returning to eighth action 616, if the temporary count variable is less than bin size, method 600 returns to fourth action 608.

Returning to fourth action 608, if no tuples remain to be looped through, method 600 proceeds to tenth action 620, where PGM feature importance system 110 determines if the temporary count variable is greater than 0. If so, method 600 proceeds to eleventh action 622, where PGM feature importance system 110 adds the maximum feature value to the bin list. Then, method 600 proceeds to twelfth action 624, where PGM feature importance system 110 returns the bin list, and method 600 ends.

Returning to tenth action 620, if the temporary count variable is equal to or less than 0, method 600 proceeds to twelfth action 624, where PGM feature importance system 110 returns the bin list, and method 600 ends.

Reference in the foregoing specification to "one embodiment", "an embodiment", or "some embodiments" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been illustrated and described, it will be understood that various changes and modifications to the foregoing embodiments may become apparent to those skilled in the art without departing from the spirit and scope of the present invention.

What is claimed is:

1. A computer-implemented method, comprising:
generating, by a computer comprising a processor and memory, a probabilistic graphical model, based on historical attributes of a supply chain comprising one or more supply chain entities, to represent the performance of the one or more supply chain entities in the supply chain;
receiving, by the computer, product data comprising an image of one or more items, wherein the product data is received from automated machinery having at least one sensor;
selecting, by the computer, one or more supply chain entity target variables associated with the one or more items;
collating, by the computer and with the use of one or more machine learning models, a list of one or more features and feature classes pertaining to the one or more selected supply chain entity target variables;
pruning, by the computer, at least one of the one or more features from the list;
generating, by the computer, one or more bins in which to distribute the one or more features in the list;
modeling, with the computer, a network graph incorporating the one or more features in the list, feature classes, and bins;
determining, with the computer, one or more inferences pertaining to the one or more supply chain entity target variables using the network graph, one or more features in the list, feature classes, and bins;
instructing, with the computer, the automated machinery to adjust inventory levels at one or more stocking points, wherein the inventory levels are associated with the one or more items; and
instructing, with a warehouse management system, a second automated machinery to prepare items of the one or more items for shipment by obtaining the prepared items of the one or more items from inventory or a staging area and packing the prepared items of the one or more items on a pallet in a proper configuration for shipment.

2. The computer-implemented method of claim 1, wherein the network graph comprises a Bayesian network graph.

3. The computer-implemented method of claim 1, wherein at least one of the one or more machine learning models comprises a least absolute shrinkage and selection operator machine learning model.

4. The computer-implemented method of claim 1, further comprising:
binning the one or more features from the list into the one or more bins, based at least in part on a number of records of each feature from the one or more features from the list and a desired number of bins.

5. The computer-implemented method of claim 4, wherein the one or more features, after being binned into the one or more bins, are evenly distributed throughout the one or more bins.

6. The computer-implemented method of claim 5, further comprising:
determining, based on the one or more features evenly distributed throughout the one or more bins, a bin of the one or more bins most likely to result in a target service level agreement being reached.

7. The computer-implemented method of claim 1, further comprising:
generating a supply chain plan for the supply chain based on the one or more inferences pertaining to the one or more supply chain entity target variables.

8. A system comprising a computer, the computer comprising a processor and memory and configured to:
generate a probabilistic graphical model, based on historical attributes of a supply chain comprising one or more supply chain entities, to represent the performance of the one or more supply chain entities in the supply chain;
receive product data comprising an image of one or more items, wherein the product data is received from automated machinery having at least one sensor;
select one or more supply chain entity target variables associated with the one or more items;
collate with the use of one or more machine learning models, a list of one or more features and feature classes pertaining to the one or more selected supply chain entity target variables;
prune at least one of the one or more features from the list;
generate one or more bins in which to distribute the one or more features in the list;
model a network graph incorporating the one or more features in the list, feature classes, and bins;
determine one or more inferences pertaining to the one or more supply chain entity target variables using the network graph, one or more features in the list, feature classes, and bins;
instruct the automated machinery to adjust inventory levels at one or more stocking points, wherein the inventory levels are associated with the one or more items; and
instruct, with a warehouse management system, a second automated machinery to prepare items of the one or more items for shipment by obtaining the prepared items of the one or more items from inventory or a staging area and packing the prepared items of the one or more items on a pallet in a proper configuration for shipment.

9. The system of claim 8, wherein the network graph comprises a Bayesian network graph.

10. The system of claim 8, wherein at least one of the one or more machine learning models comprises a least absolute shrinkage and selection operator machine learning model.

11. The system of claim 8, wherein the computer is further configured to:
bin the one or more features from the list into the one or more bins, based at least in part on a number of records of each feature from the one or more features from the list and a desired number of bins.

12. The system method of claim 11, wherein the one or more features, after being binned into the one or more bins, are evenly distributed throughout the one or more bins.

13. The system of claim 12, wherein the computer is further configured to:
determine, based on the one or more features evenly distributed throughout the one or more bins, a bin of the one or more bins most likely to result in a target service level agreement being reached.

14. The system of claim 8, wherein the computer is further configured to:
generate a supply chain plan for the supply chain based on the one or more inferences pertaining to the one or more supply chain entity target variables.

15. A non-transitory computer-readable storage medium embodied with software, the software when executed being configured to:
generate, by a computer comprising a processor and memory, a probabilistic graphical model, based on historical attributes of a supply chain comprising one or more supply chain entities, to represent the performance of the one or more supply chain entities in the supply chain;
receive, by the computer, product data comprising an image of one or more items, wherein the product data is received from automated machinery having at least one sensor;
select, by the computer, one or more supply chain entity target variables associated with the one or more items;
collate, by the computer and with the use of one or more machine learning models, a list of one or more features and feature classes pertaining to the one or more selected supply chain entity target variables;
prune, by the computer, at least one of the one or more features from the list;
generate, by the computer, one or more bins in which to distribute the one or more features in the list;
model, with the computer, a network graph incorporating the one or more features in the list, feature classes, and bins;
determine, with the computer, one or more inferences pertaining to the one or more supply chain entity target variables using the network graph, one or more features in the list, feature classes, and bins;
instruct, with the computer, the automated machinery to adjust inventory levels at one or more stocking points, wherein the inventory levels are associated with the one or more items; and
instruct, with a warehouse management system, a second automated machinery to prepare items of the one or more items for shipment by obtaining the prepared items of the one or more items from inventory or a staging area and packing the prepared items of the one or more items on a pallet in a proper configuration for shipment.

16. The non-transitory computer-readable storage medium of claim 15,
wherein the network graph comprises a Bayesian network graph.

17. The non-transitory computer-readable storage medium of claim 15, wherein at least one of the one or more machine learning models comprises a least absolute shrinkage and selection operator machine learning model.

18. The non-transitory computer-readable storage medium of claim 15, wherein the software when executed is further configured to:
bin the one or more features from the list into the one or more bins, based at least in part on a number of records of each feature from the one or more features from the list and a desired number of bins, wherein the one or more features, after being binned into the one or more bins, are evenly distributed throughout the one or more bins.

19. The non-transitory computer-readable storage medium of claim 18, wherein the software when executed is further configured to:
   determine, based on the one or more features evenly distributed throughout the one or more bins, a bin of the one or more bins most likely to result in a target service level agreement being reached.

20. The non-transitory computer-readable storage medium of claim 15, wherein the software when executed is further configured to:
   generate a supply chain plan for the supply chain based on the one or more inferences pertaining to the one or more supply chain entity target variables.

\* \* \* \* \*